US009041773B2

(12) United States Patent
Chen et al.

(10) Patent No.: US 9,041,773 B2
(45) Date of Patent: May 26, 2015

(54) CONVERSION OF 2-DIMENSIONAL IMAGE DATA INTO 3-DIMENSIONAL IMAGE DATA

(75) Inventors: Caifu Chen, Zhejiang (CN); Junhua Zhou, Zhejiang (CN)

(73) Assignee: Corel Corporation, Ottawa (CA)

( * ) Notice: Subject to any disclaimer, the term of this patent is extended or adjusted under 35 U.S.C. 154(b) by 448 days.

(21) Appl. No.: 13/302,445

(22) Filed: Nov. 22, 2011

(65) Prior Publication Data

US 2013/0127989 A1    May 23, 2013

(51) Int. Cl.
H04N 13/00  (2006.01)
H04N 13/02  (2006.01)
G06T 7/00   (2006.01)

(52) U.S. Cl.
CPC .......... H04N 13/026 (2013.01); G06T 7/0071 (2013.01); G06T 7/0081 (2013.01)

(58) Field of Classification Search
CPC ..... H04N 13/00; H04N 13/026; H04N 13/02; G06T 7/0071; G06T 7/0081
USPC ..................................................... 348/77, 43
See application file for complete search history.

(56) References Cited

U.S. PATENT DOCUMENTS

| | | | |
|---|---|---|---|
| 7,039,110 B2 * | 5/2006 | Ernst et al. ............... | 375/240.16 |
| 2008/0284791 A1 * | 11/2008 | Bressan et al. ................ | 345/589 |
| 2010/0014781 A1 * | 1/2010 | Liu et al. ........................ | 382/285 |
| 2011/0058017 A1 * | 3/2011 | Lee et al. ......................... | 348/43 |
| 2011/0069152 A1 * | 3/2011 | Wang et al. ..................... | 348/43 |
| 2012/0257677 A1 * | 10/2012 | Bankoski et al. ........ | 375/240.16 |
| 2012/0294516 A1 * | 11/2012 | Lee et al. ...................... | 382/162 |
| 2012/0294521 A1 * | 11/2012 | Lee et al. ...................... | 382/164 |

OTHER PUBLICATIONS

Zhu et al., View Synthesis Oriented Depth Map Coding Algorithm, Information Processing, 2009. APCIP 2009. Asia-Pacific Conference on Jul. 18-19, 2009, pp. 104-107.*
Mignotte, Segmentation by Fusion of Histogram-Based K-Means Clusters in Different Color Spaces, IEEE Transaction on Image Processing, vol. 17, No. 5, May 2008, pp. 780-787.*
Moore, K-means and Hierachical Clustering, www.cs.cmu.edu/~awm.*
International Search Report for application No. PCT/CA2012/001079 dated Feb. 11, 2013.
"Depth Map Generation for 2D-to-3D Conversion by Short-Term Motion Assisted Color Segmentation", Chang et al., 2007 IEEE International Conference on Multimedia and Expo, pp. 1958-1961, Jul. 2-5, 2007.

(Continued)

*Primary Examiner* — Jay Patel
*Assistant Examiner* — Francis G Geroleo
(74) *Attorney, Agent, or Firm* — Rosenberg, Klein & Lee (57) ABSTRACT

Two dimensional data is converted into three dimensional picture data in a method that can provide a real time high quality display during conversion. Pixels of a frame of picture data are segmented to create pixel segments by applying a k-means algorithm. The k-means algorithm groups pixels based on closeness of a combined value that includes luma, chroma, and motion information. By balancing this information the algorithm collects pixels into groups that are assigned relative depths to turn the two-dimensional information into three-dimensional information for display. Another method includes determining a depth map for the different pixel segments by determining an amount of motion of one of the pixel segments between two frames of a video and scaling the three-dimensional depth of one of the pixel segments based on the amount of motion between the two frames.

24 Claims, 3 Drawing Sheets

(56) References Cited

OTHER PUBLICATIONS

"Depth Map Generation for 2D-to-3D Conversion by Limited User Inputs and Depth Propagation", Yan et al., 3DTV Conference: The True Vision—Capture, Transmission and Display of 3D Video (3DTV-CON) 2011, pp. 1-4, May 16-18, 2011.
"A Tutorial on Clustering Algorithms", "K-Means Clustering", entire document, Feb. 9, 2010.
"Generating the Depth Map from the Motion Information of H. 264-Encoded 2D Video Sequence", Pourazad et al., Hindawi Publishing Corporation, EURASIP Journal on Image and Video Process, vol. 2010, Article ID 108584, pp. 1-13, Apr. 19, 2010.
"2D-to-3D conversion Based on Motion an Color Mergence", Xu et al., 3DTV Conference: The True Vision—Capture, Transmission and Display of 3D Video, 2008, pp. 205-208, May 28-30, 2008.
"Unsupervised Object Segmentation for 2D to 3D Conversion", Kunter et al., Stereoscopic Displays and Applications XX, SPIE vol. 7237, pp. 1-10, Feb. 18, 2009.
"Priority Depth Fusion for the 2D to 3D Conversion System", Chang et al., Three-Dimensional Image Capture and Applications 2008, SPIE vol. 6805, Feb. 25, 2008.
"High-Quality 2D to 3D Video Conversion Based on Robust MRF-Based Object Tracking and Reliable Graph-Cut-Based Contour Refinement", Kim et al., International Conference on ICT Convergence (ICTC) 2011, pp. 360-365, Sep. 28-30, 2011.
"A Depth Extraction Method Based on Motion and Geometry for 2D to 3D Conversion", Huang et al., Third International Symposium on Intelligent Information Technology Application IITA 2009, vol. 3, pp. 294-298, Nov. 21-22, 2009.

\* cited by examiner

CONVERSION OF 2-DIMENSIONAL IMAGE DATA INTO 3-DIMENSIONAL IMAGE DATA

COMPUTER PROGRAM LISTING APPENDIX

Computer program listings, written in C++ code, co-filed with EFS-Web, and identified as follows are incorporated by reference as if fully re-written herein: 2DTO3D_ALGORITHM.txt (40,392 bytes).

COPYRIGHT NOTICE

The computer program listings portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to image data processing and display and more particularly to higher efficiency conversion of two dimensional image data into three dimensional image data for three dimensional display.

BACKGROUND

Visual media is an integral part of entertainment and information exchange in today's world. As technology advances, consumers desire improved quality in the video streams that they watch. Typical video or picture data is view on a screen as a two dimensional image without a third or depth dimension. Providing video or picture data having a third or depth dimension is also known.

If video or picture data is captured only as a two dimensional image and there is a desire to view or display the captured video or image as a three dimensional image, the two dimensional image data needs to be converted into three dimensional image data. Certain methods of converting this data are known in the art.

In one known technique called the structure from motion (SFM) approach, pixels in consecutive frames of video data are tracked to determine depth differences between moving pixels and still pixels. The motion structure is recovered, and a depth map or map of relative depths of pixels in an image is determined using geometry fitting of the motion structure. This approach is complex and requires large amounts of processing power (also known as having "high time complexity"). Accordingly, this approach is less desirable, especially in an environment where a three dimensional image is requested to be displayed immediately from two dimensional data. An example is where a person having a two dimensional video want to play that video in three dimensions and does not want to wait for a conversion process, instead relying on that conversion to be done in real time.

Another known technique called the DFC (Depth From Cues) technique involves creating depth from various cues. In one known version of this approach, pixel motion vector between frames of video data is the sole image cue used to calculate depth. In another version of this approach, color information is used as the sole image cue to calculate depth. Although these techniques can be used in a real time conversion, visual quality can be lacking due to flicker or uneven determination depth among frames in a video.

BRIEF DESCRIPTION OF THE DRAWINGS

The above needs are at least partially met through provision of the conversion of 2-dimensional image data into 3-dimensional image data described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, methods, apparatuses, and computer readable media are described for converting two dimensional picture data into three dimensional picture data. One example method includes segmenting pixels of a frame of picture data to create pixel segments by applying a k-means algorithm. The k-means algorithm groups pixels based on closeness of a combined value that includes both luma information and chroma information and if the picture data is video data, motion information. As known in the art, luma represents luminance with a brightness of a pixel and chroma represents the chrominance with the color information for a particular pixel. By balancing this information the k-means algorithm groups pixels into groups that are then assigned relative to depths to turn the original two-dimensional information into three-dimensional information for display.

Another method for converting two-dimensional picture data into three-dimensional picture data includes determining a depth map for the different pixel segments by determining an amount of motion of one of the pixel segments between two frames of picture data and video and scaling the three-dimensional depth of one of the pixel segments based on the amount of motion between the two frames. In this example, the three-dimensional depth of one of the pixel segments is kept to be the same or about the same as the same or corresponding pixel segment in an earlier frame of the video data. In this approach, portions of the video do not appear to change depth between frames thereby reducing flicker for the video. By improving the segmentation process of the pixels of picture data, the quality of the three-dimensional images created from an original two-dimensional image is improved. Moreover, these approaches can be applied in a real-time application such that two-dimensional picture or video data can be converted on the fly to three-dimensional picture or video data for contemporaneous display for a user.

Figure 1:
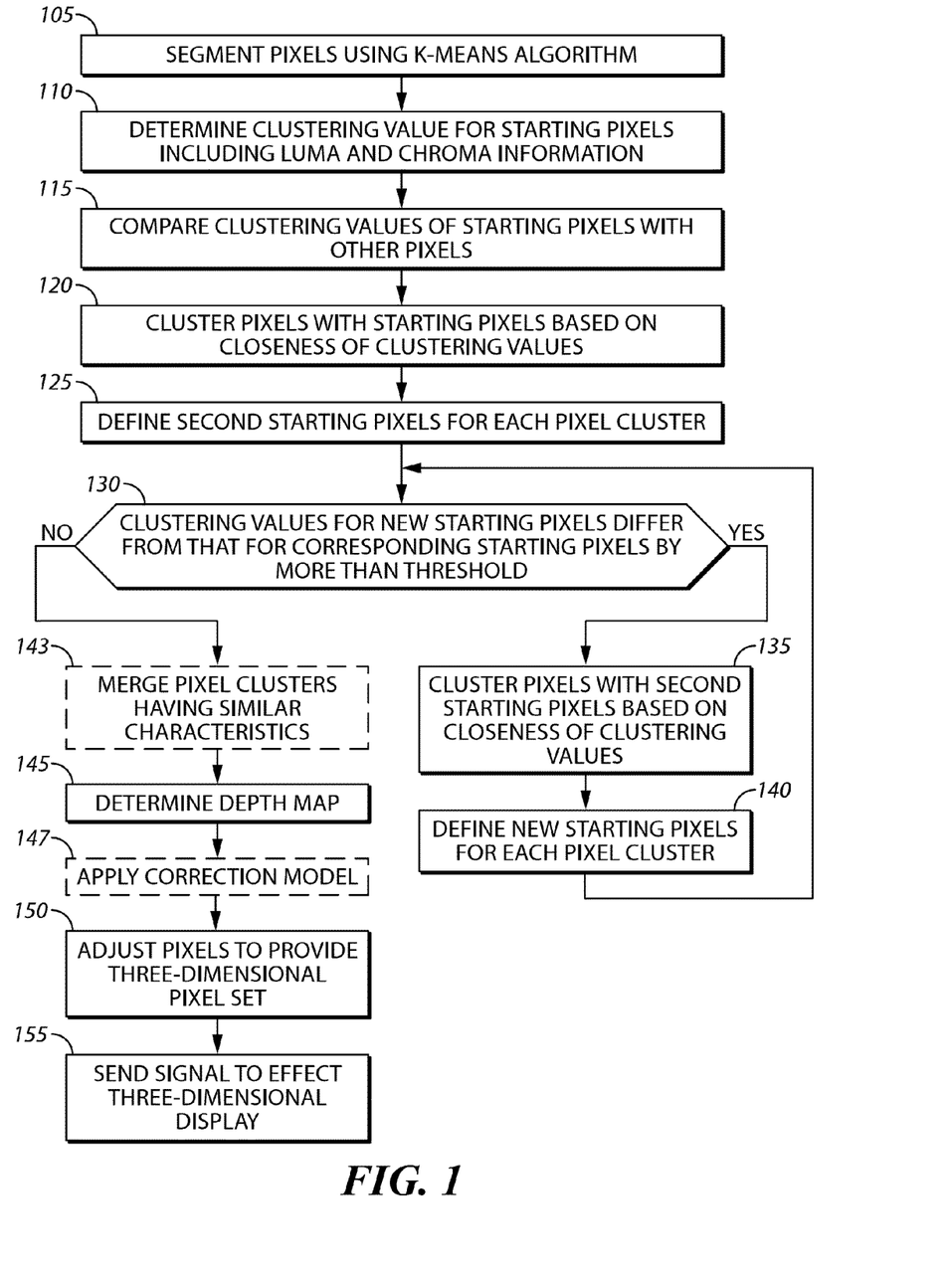
FIG. 1 comprises a flow chart of an example method of converting two dimensional data into three dimensional data as configured in accordance with various embodiments of the invention.

These and other benefits may become clearer upon making a thorough review and study of the following detailed description. Referring now to the drawings, and in particular to FIG. 1, an illustrative process that is compatible with many of these teachings will now be presented. A method of converting two-dimensional picture data into three-dimensional picture data for real-time display includes using a computing device to segment 105 pixels of a frame of picture data to create pixel segments comprising pixel clusters by applying a k-means algorithm. In an example approach, before segmenting the pixels the picture data is converted from a native format to a YUV format, which is a pixel information encoding standard known in the art where a pixel is represented by a luma or luminance value and two chroma or color values. Also, optionally a scene-cut detection analysis is performed if the picture data is video data to determine whether motion information should be used. If the frame being converted is adjacent to a scene cut, then pixel motion analysis relative to a frame from a different scene should not be used. Motion analysis as described below can be done before segmenting the pixels to have the motion information available during the two-dimension to three-dimension conversion process.

Figure 2:
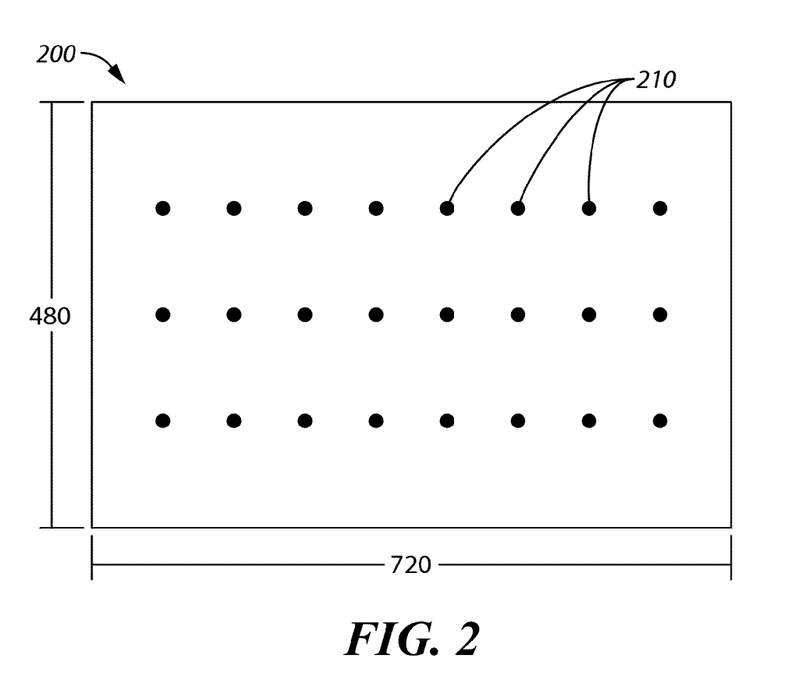
FIG. 2 comprises a representation of an example layout of starting pixels for an example pixel clustering method configured in accordance with various embodiments of the invention.

Pixel clustering is performed to reduce processing time because operating on groups of pixels instead of individual pixels reduces the complexity of the conversion. The pixel clustering is performed on the basis of various cues indicating that certain pixels should be in the same three-dimensional plane and therefore should be converted together. Applying the k-means algorithm to perform the pixel clustering in the example method of FIG. 1 includes determining 110 a clustering value for individual starting pixels wherein the clustering value comprises a combination of luma and chroma information of the individual starting pixels. The positions of the individual starting pixels are determined based on the original picture size. For example, for a picture size of 720×480 pixels, there are 24 start points or starting pixels. An 8×3 grid of start points are distributed equally and evenly throughout the picture. With brief reference to FIG. 2, a 720×480 picture 200 is illustrated having individual starting pixels 210 distributed evenly throughout the picture 200.

The clustering value for each starting pixel is determined based on the luma and chroma information for the individual pixel. In the case of video data, the determining the clustering value for individual starting pixels includes determining the clustering value comprising a combination of luma, chroma, and motion information of the individual starting pixels. In this case, the motion information comprises information relating to relative movement of pixels between the frames of video data. The clustering value can be represented by the following equation: Sumofdelta=$\alpha$*deltalu+$\beta$*deltacr+$\gamma$*(deltamvx+deltamvy), where Sumofdelta is the clustering value, deltalu is the luma information, deltacr is the chroma information, deltamvx is the motion information in the horizontal direction, and deltamvy is the motion information in the vertical direction. The constants $\alpha$, $\beta$, and $\gamma$ are fixed constants. For still picture data, $\gamma$ is 0 thereby eliminating the motion information from the equation. Otherwise, in this example, the constant $\alpha$ is set at 0.57, the constant $\beta$ is set at 0.28 and the constant $\gamma$ is set at 0.15. These constants are set based on experimentation and are adapted to provide collect pixels into groups for depth mapping to provide an optimum three-dimensional viewing experience. The experimentation procedure included a trial and error test by performing a first segmentation procedure on a frame of video data, storing the clustering values, and viewing a three-dimensional representation of the result. A comparison of the clustering values of the pixel clusters that visually appeared to should have the same depth was completed. In response to these tests, the constants were refined to their present values. These constants could be adapted to be optimized to other applications such as gaming platforms because the video data characteristics may vary from one video type to another. A cartoon video, for example, will have the constant $\alpha$ set at 0.35, the constant $\beta$ set at 0.55, and the constant $\gamma$ set at 0.1, because chroma becomes more important in the segment process for this type of video.

The motion information is determined by comparing a pixel in a current frame of video with the surrounding pixels in a previous frame of the video data and determining whether a given pixel has moved horizontally and/or vertically to determine the deltamvx and deltamvy values. In one example approach, two steps are taken to obtain the motion information. First, a macroblock motion estimation analysis is performed to obtain macroblock motion information. Second, a least-square iteration is used to obtain global motion information from the macroblock motion information. Where a pixel or macroblock in a current frame does not have a corresponding pixel or macroblock in a previous frame, no motion information is available.

With reference again to FIG. 1, once the clustering values for the individual starting pixels is determined, the clustering values for the individual starting pixels are compared 115 to the clustering values for other pixels of the frame. The method includes clustering 120 pixels of the other pixels with the pixels of the individual starting pixels based on closeness of the clustering values to create pixel clusters associated with the individual starting pixels. Thus, the example method groups pixels together using the balance of luminance and color information with motion information, with the balance of information represented in the clustering values indicating that such pixels more likely to be in the or nearly the same three-dimensional plane.

Figure 3:
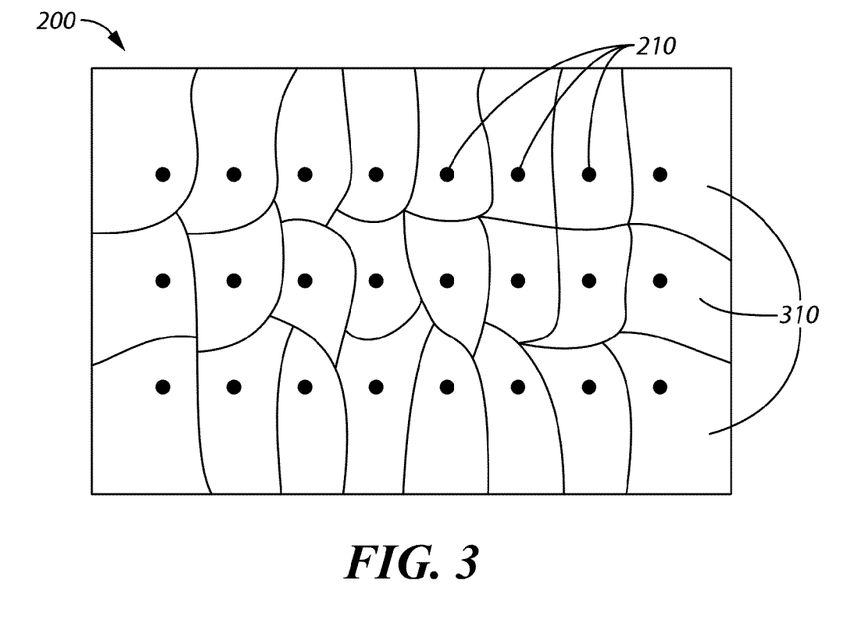
FIG. 3 comprises a representation of an example layout of starting pixels pixel clusters for an example pixel clustering method as configured in accordance with various embodiments of the invention.

An example of clustering is described with brief reference to FIG. 3. Here, the individual starting pixels 210 of the picture frame 200 of FIG. 2 have been compared to the other pixels throughout the picture frame 200 based on the clustering values for the pixels. As a result, pixel clusters 310 are defined based on how close the other pixels of the frame 200 are with respect to the clustering values to the individual starting pixels clustering values. In the example of FIG. 3, the pixel clusters 310 are represented as groups physically surrounding the individual starting pixels. This is done for ease of reference whereas in a typical application, a pixel on a far side of the frame may have a closer clustering value to an individual starting pixel on the other side of the frame than a pixel closer in terms of physical distance. This is possible because a given frame may have multiple foreground objects that have about the same spatial or three-dimensional depth even though the objects may be dispersed throughout the frame of picture information.

With the picture clusters now defined, and referring again to FIG. 1, the method includes redefining a second starting pixel 125 for individual ones of the pixel clusters. In other words, the original individual starting pixel for each pixel cluster is forgotten, and a new pixel cluster starting pixel is defined where the second starting pixel for a pixel cluster is the pixel of the pixel cluster having a clustering value in the middle of the clustering values for the pixels of the pixel cluster. Instead of using random starting points like the individual starting pixels, the second starting pixels are based on the median of the individual clustering values.

The method of FIG. 1 then includes determining at 130 whether clustering values for the second starting pixels differ from clustering values for corresponding starting pixels by more than a clustering value difference threshold. In response to determining that the cluster values for the second starting pixels differ from the clustering values for the corresponding starting pixels by more than the cluster value difference threshold, steps 135 and 140 are repeated. Step 135 includes clustering pixels of the frame other than the second starting pixels based on closeness of the clustering values to create new pixel clusters associated with individual ones of the second starting pixels. The method also includes redefining 140 new starting pixels for the new pixel clusters. The new starting pixel for a new pixel cluster is the pixel of the new pixel cluster having a clustering value in the middle of the clustering values for the pixels of the new pixel cluster. In short, the k-means algorithm simply repeats starting with the second starting pixel for the pixel clusters to redefine new pixel clusters using the clustering value equation described above. This process is repeated until the clustering values for a new cluster differ from the starting pixels for the immediately previous pixel cluster by less than the cluster value difference threshold.

By one optional approach, the clustering value difference thresholds may be defined to be different values for different pixel clusters. Using this approach, certain pixel clusters will not be repeated by the k-means algorithm as often because it will be easier to satisfy the clustering value difference threshold. In one example, the clustering value difference can be defined so that the k-means algorithm is applied only once where steps 135 and 140 are not executed for a defined set pixels. In one example, the default clustering value difference threshold is set to a value of 1024, whereas of pixels of a second type different from the default pixels have a clustering value difference threshold of infinity, which prevents these pixels from being further analyzed under the k-means algorithm. By another approach, pixels are defined into types before segmenting. For example, if the pixels are consecutively numbered, even numbered pixels are defined to be a first type that will be segmented as described above with a default clustering value difference threshold. The odd pixels are defined to be a second type with an infinite clustering value difference or otherwise programmed to only have the k-means algorithm applied once such that only steps 115 and 120 are applied to these pixels. So configured, only a subset of pixels are fully processed by the segmenting process, thereby conserving processing resources. Processing some of the pixels only once through the k-means algorithm does not significantly impair the segmenting process because the fully processed pixels will dominate the three-dimensional image on display, and the initial processing of the less processed subset is sufficient to not be visually jarring when mixed with the remaining fully processed pixels.

As discussed above, the k-means algorithm repeats until the clustering values for the new starting pixels differ from clustering values for previous starting pixels by less than the clustering value difference. In response to reaching this state, pixel clusters having at least one of luma, chroma, or motion information within a cluster merge value threshold are optionally merged 143. By merging pixel clusters with close luma, chroma, or motion values, fewer pixel clusters need to be separately processed during the depth map and pixel adjustment process, thereby saving processing time, which is helpful in real time conversion applications In one example, where the k-means algorithm described above is used to segment the pixels, any one or more of the variables deltacr, deltalu, deltamvx, and deltamvy can be compared between two pixel clusters. To save time only one or two values are checked. For instance, if the deltacr between two pixel cluster centers or starting pixels is less than 2, the two pixel clusters or segments are merged. This threshold for each variable is set by trial and error experimentation and may be adjusted for different video type applications. Example clustering value differences for the different variables are 2 for deltacr, 12 for deltalu, 2 for deltamvx, and 2 for deltamvy.

After the pixel clustering process creates a plurality of pixel segments in the picture data, a depth map is determined 145 for the pixel segments to define three-dimensional depths of the pixel segments relative to each other. In one example to calculating the depths of pixels in a frame, a new variable relating to texture information is introduced and defined by the following equation:

$$Deltatg = \sum_{i=0}^{n}(pixel[i])^2 - \frac{\left(\sum_{i=0}^{n}pixel[i]\right)^2}{n},$$

where Deltatg is the texture information, and pixel[i] is the luma value of the pixel. The texture information is used in this example in the following equation to determine the depth of the pixel: Intradepth=k0*(deltalu+deltacr)+k1*(deltamvx+deltamvy)+k2*Deltatg, where Intradepth is the pixel depth and the other variables are the same as defined above. The constants have values of k0=0.4, k1=0.3, and k2=0.3, which were determined by trial and error experimentation and may be modified for a particular application. If the picture data is a still picture or the frame is adjacent to a scene cut, the motion information is set to zero.

In one approach, an amount of motion of one of the pixel segments is determined between two frames of video picture data, then a three-dimensional depth of one of the pixel segments is scaled based on the amount of motion between the two frames. In this approach to depth fusion, the three-dimensional depth of one of the pixel segments is a same depth or nearly the same depth as the same segment in an earlier frame where there is a limited amount of motion between the two frames for the one of the pixel segments. The limited amount of motion between the two frames for the one pixel segment is an amount of motion limited enough to determine that the pixel segments for the earlier frame and the current frame are the same object in the picture, such that the object in the picture will not have significantly changed depth between the first or earlier video frame and the current video frame. So configured, objects will not suddenly change depth between video frames in the three dimensional display of the data thereby resulting in an improved three-dimensional viewing experience.

In one example depth fusion process, the depth of a second frame is scaled based on motion of pixels relative to a previous frame according to the following equation: IntradepthB=n0*IntradepthA+n1*IntradepthB, where IntradepthB means a pixel or pixel block's Intradepth or defined depth in the current frame and IntradepthA means the corresponding pixel or pixel block's Intradepth in the previous frame. The constants n0 and n1's values depend on the motion sameness between the pixels or pixel blocks in the two frames where the more that their motions are similar, the larger of n0 and where the motion for the pixels is less similar, the value for m1 is larger. For example, if the motion between frames is zero, n0 is 1 and n1 is 0 to make the depth identical between the two frames. If the motion between the frames in this example is non-zero, n0 is 0.9 and n1 is 0.1 to allow the three dimensional visual effect to be comfortable and reduce flicker. In this approach, because the various luma, chroma, and motion information values are used as described above in determining the depth, this information is inherently used in the depth fusion process.

Referring again to FIG. 1, optionally a correction model is applied 147 to the three-dimensional depths of the pixel segments by varying the three-dimensional depth of the pixel based on the pixels vertical placement in the frame. The correction model is designed to take into account the fact that a viewer's distance from the top of a viewing screen and the bottom of a viewing screen is different, and therefore the three-dimensional depths of the pixels need to be appropriately scaled to that distance. For example, in a movie theatre, the viewers are closer to the bottom of the screen than they are from the top of the screen. Accordingly, pixels at the top of the screen are brought farther to the front of the three-dimensional image to account for this visual difference. In one approach, the following equation can be applied to scale the pixels to account for this correction model: Intradepth_correction=intradepth*m0+(depthv)*m1, where depthv is the vertical vector of the pixel's depth in the correction model. The constants m0 and m1 were determined by trial and error experimentation, have the values m0=0.5 and m1=0.5, and may be modified for a particular application.

Optionally, the corrected data may be smoothed using an average-filter method as is known in the art. In one approach, the average-filter method is applied a plurality of times, but if the frame is a still picture or near a scene cut approach and the motion estimation shows that most of the pixels or macroblocks are overlapping, then the number of applications of the average-filter method is reduced to reduce processing time. Then, with continuing reference to FIG. 1, the pixels of the frame of picture data are adjusted 150 to provide a three-dimensional pixel set for the frame using the depth map. This process, commonly known as depth image based rendering (DIBR) converts the pixels into a left-right configuration that provides the visual three dimensional effect for the viewer upon display. The left-right configuration includes separating each pixel into a right picture pixel and a left picture pixel. The separation of the left pixel and the right pixel pictures creates the three-dimensional effect for the viewer.

In one example, the pixel is fixed as a right picture pixel, and the left picture pixel is derived from the right picture pixel using the following depth offset equations that determine how much the left picture pixel is horizontally offset from the right pixel:

$$\text{offset} = \begin{cases} -\text{depth} * L0, & \text{depth} > dl \\ \text{depth} * L1, & \text{depth} < dl, \end{cases}$$

where "depth" means the pixel's depth, L0 and L1 are constants, and dl sets the three dimensional picture's distance from the viewer. L0, L1, and dl depend on the depth of field set by the user. For example, when "depth" is greater than dl, pixel will get pixel from the left side, vice versa, from the right side. More specifically in this example, a "depth of field" variable may be configured to be set by a user to control the scale between the pixel offset that corresponds to a particular depth. At the end of the depth map calculation, the depth is normalized to a range of 0 to 255 (stored in a BYTE) so that the "depth of field" variable decides the range of a pixel maximum offset. If a pixel max offset is 20, and dl is 120, the offset=(depth−120)*(20/255). The "depth of field" and dl variables can be set by the user.

Referring again to FIG. 1, a signal is then sent 155 to effect a three-dimensional display of the three-dimensional pixel set via a display device. For instance, the three-dimensional data may be sent from a processing system that executed the above method to the display device for display. In another approach, the processing system sends a signal to the display device to obtain data for display from the three-dimensional data. Other ways of effecting the final display of the three-dimensional data by a viewer are possible.

Figure 4:
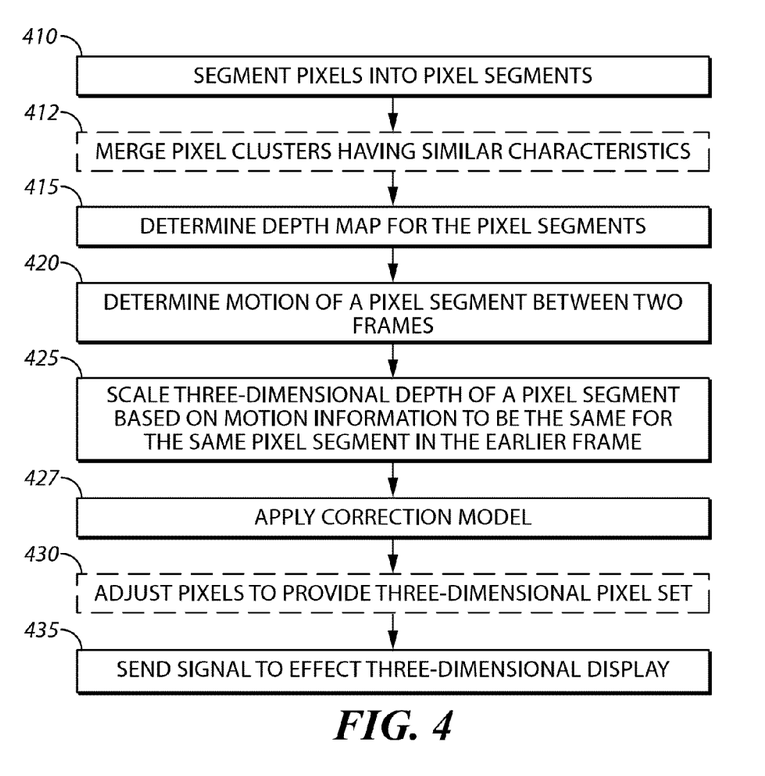
FIG. 4 comprises a flow chart of an example method of converting two dimensional data into three dimensional data as configured in accordance with various embodiments of the invention.

With reference to FIG. 4, another example method of converting two-dimensional picture data into three-dimensional picture data for real-time display will be described. Pixels of a frame of picture data are segmented 410 to create pixel segments comprising pixel clusters. The segmenting can be done using any known segmenting process or the k-means approach described above. Optionally, pixel clusters having clustering values within a cluster merge value threshold are merged 412 as described above. A computing device is used to determine 415 a depth map for the pixel segments to define three-dimensional depth of the pixel segments relative to each other. This determining of the depth map includes determining 420 an amount of motion of one of the pixel segments between two frames of picture data and a video and scaling 425 the three-dimensional depth of the one of the pixel segment based on the amount of motion between the two frames. In this example, the three-dimensional depth of the one of the pixel segments is a same or nearly the same depth as an earlier frame where there is a limited amount of motion between the two frames for the one of the pixel segments. The method optionally includes applying 427 a correction model to the three-dimensional model depths by varying the three-dimensional depth of a pixel based on the pixels vertical placement in the frame. The correction model application is described in more detail above. The method further includes adjusting 430 the pixels of the frame of picture data to provide a three-dimensional pixel set for the frame using the depth map. A signal is sent 435 to effect a three-dimensional display of the three-dimensional pixel set via a data display device. The steps 412, 427, 430, and 435 are similar to those discussed above with reference to FIG. 1.

So configured, two dimensional picture data is converted into three-dimensional picture data to provide a three-dimensional visual effect for someone viewing the display. The methods described above can provide three-dimensional data that provides a higher quality three-dimensional effect while displaying the picture or video contemporaneously with the data conversion, which can be difficult given the processing power needed to perform such a conversion.

Figure 5:
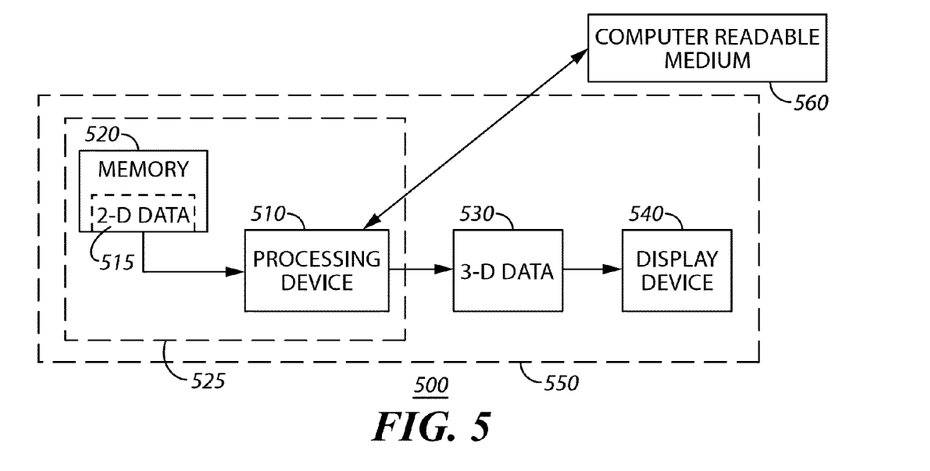
FIG. 5 comprises a block diagram of an apparatus as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided. The example apparatus for converting two-dimensional picture data into three-dimensional picture data for real-time display includes a processing device 510 configured to segment pixels of the frame of picture data stored on a storage device 520 to create pixel segments comprising pixel clusters by applying a k-means algorithm.

Those skilled in the art will recognize and appreciate that such a processing device can comprise a fixed-purpose hard-wired platform or can comprise a partially or wholly programmable platform. All of these architectural options are well known and understood in the art and require no further description here. For example, for a personal computer implementing the methods described by this disclosure, the processing device 510 may comprise an INTEL CORE 2 processing device, and the storage device 520 may be a memory such as a one gigabyte hard drive, flash drive, or the like. The processing device 510 executes the methods described above to create three-dimensional data 530 to effect a three-dimensional display of the three-dimensional pixel set via a display device 540. The display device 540 may be any visual display device known in the art.

As shown in FIG. 5, the processing device 510 and memory 520 may be separate physical devices or may be combined in a single architectural platform denoted as element 525. Similarly, the processing aspect of the processing device 510 and memory 520 may be integrated in the same hardware as the display device 540. Such a device 550 may comprise a computer, a gaming device, a smart phone, a tablet computer, or any other computing device.

In an additional alternative embodiment, the functionality or logic described in reference to FIGS. 1 and 4 may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s). In either case, a non-transitory computer readable medium 560 including instructions configured to cause a computing device to perform operations of the methods described above can be provided. In FIG. 5, the computer readable medium is shown as separate from the apparatus executing the code to provide a three dimensional display, but it may be incorporated into the hardware elements 525 or 550. Such non-transitory computer readable media include all standard computer-readable media and only excludes propagating transitory signals.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of converting two dimensional picture data into three dimensional picture data for real time display, the method comprising:
   using a computing device to segment pixels of a frame of picture data to create pixel segments
   comprising pixel clusters by applying a k-means algorithm, the applying the k-means algorithm comprising:
   determining a clustering value for individual starting pixels wherein the clustering value comprises a combination of luma and chroma information of the individual starting pixels;
   comparing the clustering values for the individual starting pixels to the clustering values for other pixels of the frame;
   clustering pixels of the other pixels with pixels of the individual starting pixels based on closeness of the clustering values to create pixel clusters associated with the individual starting pixels;
   re-defining a second starting pixel for individual ones of the pixel clusters, the second starting pixel for a pixel cluster being the pixel of the pixel cluster having a clustering value in the middle of the clustering values for the pixels of the pixel cluster;
   determining whether clustering values for the second starting pixels differ from clustering values for corresponding starting pixels by more than a clustering value difference threshold, wherein the applying the k-means algorithm further comprises defining the clustering value difference threshold to be different values for different pixel clusters;
   in response to determining that the clustering values for the second starting pixels differ from the clustering values for corresponding starting pixels by more than the cluster value difference threshold, repeating the following:
      clustering pixels of the frame other than the second starting pixels based on closeness of the clustering values to create new pixel clusters associated with individual ones of the second starting pixels, and
   re-defining new starting pixels for the new pixel clusters, the new starting pixel for a new pixel cluster being the pixel of the new pixel cluster having a clustering value in the middle of the clustering values for the pixels of the new pixel cluster,
   until the clustering values for the new starting pixels differ from clustering values for previous starting pixels by less than the clustering value difference threshold;
   determining a depth map for the pixel segments to define three dimensional depths of the pixel segments relative to each other; adjusting the pixels of the frame of picture data to provide a three-dimensional pixel set for the frame using the depth map;
   sending a signal to effect a three-dimensional display of the three-dimensional pixel set via a display device.

2. The method of claim 1 wherein the determining the clustering value for individual starting pixels comprises determining the clustering value comprising a combination of luma, chroma, and motion information of the individual starting pixels, wherein the motion information comprises information relating to relative movement of pixels between frames of video data.

3. The method of claim 1 wherein the determining the depth map comprises:
   determining an amount of motion of one of the pixel segments between two frames of picture data in a video;
   scaling a three dimensional depth of one of the pixel segments based on the amount of motion between the two frames, wherein the three dimensional depth of the one of the pixel segments is a same depth as an earlier frame where there is a limited amount of motion between the two frames for the one of the pixel segments.

4. The method of claim 1 further comprising merging pixel clusters having at least one of luma, chroma, or motion information within a cluster merge value threshold.

5. The method of claim 1 further comprising applying a correction model to the three dimensional depths by varying the three dimensional depth of a pixel based on the pixel's vertical placement in the frame.

6. A method of converting two dimensional picture data into three dimensional picture data for real time display, the method comprising:

segmenting pixels of a frame of picture data to create pixel segments comprising pixel clusters by using a computing device to segment pixels comprises applying a k-means algorithm, the applying the k-means algorithm comprising:

determining a clustering value for individual starting pixels wherein the clustering value comprises a combination of luma, chroma, and motion information of the individual starting pixels;

comparing the clustering values for the individual starting pixels to the clustering values for other pixels of the frame;

clustering pixels of the other pixels with pixels of the individual starting pixels based on closeness of the clustering values to create pixel clusters associated with the individual starting pixels;

re-defining a second starting pixel for individual ones of the pixel clusters, the second starting pixel for a pixel cluster being the pixel of the pixel cluster having a clustering value in the middle of the clustering values for the pixels of the pixel cluster;

determining whether clustering values for the second starting pixels differ from clustering values for corresponding starting pixels by more than a clustering value difference threshold, wherein the applying the k-means algorithm further comprises defining the clustering value difference threshold to be different values for different pixel clusters;

in response to determining that the clustering values for the second starting pixels differ from the clustering values for corresponding starting pixels by more than the cluster value difference threshold, repeating the following:

clustering pixels of the frame other than the second starting pixels based on closeness of the clustering values to create new pixel clusters associated with individual ones of the second starting pixels, and re-defining new starting pixels for the new pixel clusters, the new starting pixel for a new pixel cluster being the pixel of the new pixel cluster having a clustering value in the middle of the clustering values for the pixels of the new pixel cluster, until the clustering values for the new starting pixels differ from clustering values for previous starting pixels by less than the clustering value difference threshold;

using the computing device to determine a depth map for the pixel segments to define three dimensional depth of the pixel segments relative to each other, the determining the depth map comprising:

determining an amount of motion of one of the pixel segments between two frames of picture data in a video, and scaling the three dimensional depth of the one of the pixel segments based on the amount of motion between the two frames, wherein the three dimensional depth of the one of the pixel segments is a same depth as an earlier frame where there is a limited amount of motion between the two frames for the one of the pixel segments;

adjusting the pixels of the frame of picture data to provide a three-dimensional pixel set for the frame using the depth map; and sending a signal to effect a three-dimensional display of the three-dimensional pixel set via a display device.

7. The method of claim 6 further comprising merging pixel clusters having at least one of luma, chroma, or motion information within a cluster merge value threshold.

8. The method of claim 6 further comprising applying a correction model to the three dimensional depths by varying the three dimensional depth of a pixel based on the pixel's vertical placement in the frame.

9. An apparatus for converting two dimensional picture data into three dimensional picture data for real time display, the apparatus comprising:

a processing device configured to segment pixels of a frame of picture data stored on a storage device to create pixel segments comprising pixel clusters by applying a k-means algorithm, the applying the k-means algorithm comprising:

determining a clustering value for individual starting pixels wherein the clustering value comprises a combination of luma and chroma information of the individual starting pixels;

comparing the clustering values for the individual starting pixels to the clustering values for other pixels of the frame;

clustering pixels of the other pixels with pixels of the individual starting pixels based on closeness of the clustering values to create pixel clusters associated with the individual starting pixels;

re-defining a second starting pixel for individual ones of the pixel clusters, the second starting pixel for a pixel cluster being the pixel of the pixel cluster having a clustering value in the middle of the clustering values for the pixels of the pixel cluster;

determining whether clustering values for the second starting pixels differ from clustering values for corresponding starting pixels by more than a clustering value difference threshold, wherein the applying the k-means algorithm further comprises defining the clustering value difference threshold to be different values for different pixel clusters;

in response to determining that the clustering values for the second starting pixels differ from the clustering values for corresponding starting pixels by more than the cluster value difference threshold, repeating the following:

clustering pixels of the frame other than the second starting pixels based on closeness of the clustering values to create new pixel clusters associated with individual ones of the second starting pixels, and re-defining new starting pixels for the new pixel clusters, the new starting pixel for a new pixel cluster being the pixel of the new pixel cluster having a clustering value in the middle of the clustering values for the pixels of the new pixel cluster, until the clustering values for the new starting pixels differ from clustering values for previous starting pixels by less than the clustering value difference threshold;

the processing device further configured to determine a depth map for the pixel segments to define three dimensional depths of the pixel segments relative to each other;

the processing device further configured to adjust the pixels of the frame of picture data to provide a three-dimensional pixel set for the frame using the depth map;

the processing device further configured to effect a three-dimensional display of the three-dimensional pixel set via a display device.

10. The apparatus of claim 9 wherein the determining the clustering value for individual starting pixels comprises determining the clustering value comprising a combination of luma, chroma, and motion information of the individual starting pixels, wherein the motion information comprises information relating to relative movement of pixels between frames of video data.

11. The apparatus of claim 9 wherein the determining the depth map comprises:
determining an amount of motion of one of the pixel segments between two frames of picture data in a video;
scaling a three dimensional depth of one of the pixel segments based on the amount of motion between the two frames, wherein the three dimensional depth of the one of the pixel segments is a same depth as an earlier frame where there is a limited amount of motion between the two frames for the one of the pixel segments.

12. The apparatus of claim 9 wherein the processing device is further configured to merge pixel clusters having at least one of luma, chroma, or motion information within a cluster merge value threshold.

13. The apparatus of claim 9 wherein the processing device is further configured to apply a correction model to the three dimensional depths by varying the three dimensional depth of a pixel based on the pixel's vertical placement in the frame.

14. An apparatus for converting two dimensional picture data into three dimensional picture data for real time display, the apparatus comprising:
a processing device configured to segment pixels of a frame of picture data stored on a storage device to create pixel segments comprising pixel clusters by applying a k-means algorithm, the applying the k-means algorithm comprising:
determining a clustering value for individual starting pixels wherein the clustering value comprises a combination of luma, chroma, and motion information of the individual starting pixels;
comparing the clustering values for the individual starting pixels to the clustering values for other pixels of the frame;
clustering pixels of the other pixels with pixels of the individual starting pixels based on closeness of the clustering values to create pixel clusters associated with the individual starting pixels;
re-defining a second starting pixel for individual ones of the pixel clusters, the second starting pixel for a pixel cluster being the pixel of the pixel cluster having a clustering value in the middle of the clustering values for the pixels of the pixel cluster;
determining whether clustering values for the second starting pixels differ from clustering values for corresponding starting pixels by more than a clustering value difference threshold, wherein the applying the k-means algorithm further comprises defining the clustering value difference threshold to be different values for different pixel clusters;
in response to determining that the clustering values for the second starting pixels differ from the clustering values for corresponding starting pixels by more than the cluster value difference threshold, repeating the following:
clustering pixels of the frame other than the second starting pixels based on closeness of the clustering values to create new pixel clusters associated with individual ones of the second starting pixels, and
re-defining new starting pixels for the new pixel clusters, the new starting pixel for a new pixel cluster being the pixel of the new pixel cluster having a clustering value in the middle of the clustering values for the pixels of the new pixel cluster,
until the clustering values for the new starting pixels differ from clustering values for previous starting pixels by less than the clustering value difference;
the processing device further configured to determine a depth map for the pixel segments to define three dimensional depth of the pixel segments relative to each other,
the determining the depth map comprising: determining an amount of motion of one of the pixel segments between two frames of picture data in a video, and
scaling the three dimensional depth of the one of the pixel segments based on the amount of motion between the two frames, wherein the three dimensional depth of the one of the pixel segments is a same depth as an earlier frame where there is a limited amount of motion between the two frames for the one of the pixel segments;
the processing device further configured to adjust the pixels of the frame of picture data to provide a three-dimensional pixel set for the frame using the depth map;
the processing device further configured to effect a three-dimensional display of the three-dimensional pixel set via a display device.

15. The apparatus of claim 14 wherein the processing device is further configured to merge pixel clusters having at least one of luma, chroma, or motion information within a cluster merge value threshold.

16. The apparatus of claim 14 wherein the processing device is further configured to apply a correction model to the three dimensional depths by varying the three dimensional depth of a pixel based on the pixel's vertical placement in the frame.

17. A non-transitory computer readable medium comprising instructions configured to cause a computing device to perform operations comprising:
segmenting pixels of a frame of picture data to create pixel segments comprising pixel clusters by applying a k-means algorithm, the
applying the k-means algorithm comprising:
determining a clustering value for individual starting pixels wherein the clustering value comprises a combination of luma and chroma information of the individual starting pixels;
comparing the clustering values for the individual starting pixels to the clustering values for other pixels of the frame;
clustering pixels of the other pixels with pixels of the individual starting pixels based on closeness of the clustering values to create pixel clusters associated with the individual starting pixels;
re-defining a second starting pixel for individual ones of the pixel clusters, the second starting pixel for a pixel cluster being the pixel of the pixel cluster having a clustering value in the middle of the clustering values for the pixels of the pixel cluster;

determining whether clustering values for the second starting pixels differ from clustering values for corresponding starting pixels by more than a clustering value difference threshold, wherein the applying the k-means algorithm further comprises defining the clustering value difference threshold to be different values for different pixel clusters;

in response to determining that the clustering values for the second starting pixels differ from the clustering values for corresponding starting pixels by more than the cluster value difference threshold, repeating the following:

clustering pixels of the frame other than the second starting pixels based on closeness of the clustering values to create new pixel clusters associated with individual ones of the second starting pixels, and re-defining new starting pixels for the new pixel clusters, the new starting pixel for a new pixel cluster being the pixel of the new pixel cluster having a clustering value in the middle of the clustering values for the pixels of the new pixel cluster, until the clustering values for the new starting pixels differ from clustering values for previous starting pixels by less than the clustering value difference threshold;

determining a depth map for the pixel segments to define three dimensional depths of the pixel segments relative to each other;

adjusting the pixels of the frame of picture data to provide a three-dimensional pixel set for the frame using the depth map;

sending a signal to effect a three-dimensional display of the three-dimensional pixel set via a display device.

18. The non-transitory computer readable medium of claim 17 wherein the determining the clustering value for individual starting pixels comprises determining the clustering value comprising a combination of luma, chroma, and motion information of the individual starting pixels, wherein the motion information comprises information relating to relative movement of pixels between frames of video data.

19. The non-transitory computer readable medium of claim 17 wherein the determining the depth map comprises:

determining an amount of motion of one of the pixel segments between two frames of picture data in a video;

scaling a three dimensional depth of one of the pixel segments based on the amount of motion between the two frames, wherein the three dimensional depth of the one of the pixel segments is a same depth as an earlier frame where there is a limited amount of motion between the two frames for the one of the pixel segments.

20. The non-transitory computer readable medium of claim 17 further comprising instructions to cause the computing device to perform operations comprising merging pixel clusters having at least one of luma, chroma, or motion information within a cluster merge value threshold.

21. The non-transitory computer readable medium of claim 17 further comprising instructions to cause the computing device to perform operations comprising applying a correction model to the three dimensional depths by varying the three dimensional depth of a pixel based on the pixel's vertical placement in the frame.

22. A non-transitory computer readable medium comprising instructions configured to cause a computing device to perform operations comprising:

segmenting pixels of a frame of picture data to create pixel segments comprising pixel clusters by applying a k-means algorithm, the applying the k-means algorithm comprising:

determining a clustering value for individual starting pixels wherein the clustering value comprises a combination of luma, chroma, and motion information of the individual starting pixels;

comparing the clustering values for the individual starting pixels to the clustering values for other pixels of the frame;

clustering pixels of the other pixels with pixels of the individual starting pixels based on closeness of the clustering values to create pixel clusters associated with the individual starting pixels;

re-defining a second starting pixel for individual ones of the pixel clusters, the second starting pixel for a pixel cluster being the pixel of the pixel cluster having a clustering value in the middle of the clustering values for the pixels of the pixel cluster;

determining whether clustering values for the second starting pixels differ from clustering values for corresponding starting pixels by more than a clustering value difference threshold, wherein the applying the k-means algorithm further comprises defining the clustering value difference to be different values for different pixel clusters;

in response to determining that the clustering values for the second starting pixels differ from the clustering values for corresponding starting pixels by more than the cluster value difference threshold, repeating the following:

clustering pixels of the frame other than the second starting pixels based on closeness of the clustering values to create new pixel clusters associated with individual ones of the second starting pixels, and re-defining new starting pixels for the new pixel clusters, the new starting pixel for a new pixel cluster being the pixel of the new pixel cluster having a clustering value in the middle of the clustering values for the pixels of the new pixel cluster, until the clustering values for the new starting pixels differ from clustering values for previous starting pixels by less than the clustering value difference threshold;

causing the computing device to determine a depth map for the pixel segments to define three dimensional depth of the pixel segments relative to each other, the determining the depth map comprising:

determining an amount of motion of one of the pixel segments between two frames of picture data in a video, and scaling the three dimensional depth of the one of the pixel segments based on the amount of motion between the two frames, wherein the three dimensional depth of the one of the pixel segments is a same depth as an earlier frame where there is a limited amount of motion between the two frames for the one of the pixel segments;

adjusting the pixels of the frame of picture data to provide a three-dimensional pixel set for the frame using the depth map;

sending a signal to effect a three-dimensional display of the three-dimensional pixel set via a display device.

23. The non-transitory computer readable medium of claim 22 further comprising instructions to cause the computing device to perform operations comprising merging pixel clusters having at least one of luma, chroma, or motion information within a cluster merge value threshold.

24. The non-transitory computer readable medium of claim 22 further comprising instructions to cause the computing device to perform operations comprising applying a correction model to the three dimensional depths by varying the three dimensional depth of a pixel based on the pixel's vertical placement in the frame.

\* \* \* \* \*